(12) United States Patent
Healy et al.

(10) Patent No.: US 12,265,841 B2
(45) Date of Patent: Apr. 1, 2025

(54) QUALITY CONTROL SYSTEM FOR QUANTUM-AS-A-SERVICE BROKERS

(71) Applicant: Dell Products L.P., Round Rock, TX (US)

(72) Inventors: Brendan Burns Healy, Whitefish Bay, WI (US); Benjamin Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 490 days.

(21) Appl. No.: 17/836,683

(22) Filed: Jun. 9, 2022

(65) Prior Publication Data

US 2023/0401086 A1 Dec. 14, 2023

(51) Int. Cl.
*G06F 9/44* (2018.01)
*G06F 9/48* (2006.01)
*G06N 10/40* (2022.01)

(52) U.S. Cl.
CPC ........... *G06F 9/4843* (2013.01); *G06N 10/40* (2022.01)

(58) Field of Classification Search
CPC ..................................................... G06F 9/4843
USPC .......................................................... 718/106
See application file for complete search history.

(56) References Cited

U.S. PATENT DOCUMENTS

2018/0276556 A1* 9/2018 Garrison .................. G06N 5/01
2022/0319219 A1* 10/2022 Tsibulevskiy ........ G06V 30/226
2022/0382605 A1* 12/2022 Griffin .................. G06F 9/5044

* cited by examiner

*Primary Examiner* — Timothy A Mudrick
(74) *Attorney, Agent, or Firm* — Workman Nydegger (57) ABSTRACT

Quality control operations for quantum processing units are disclosed. A broker application may perform quality control jobs to determine baseline characteristics about quantum processing units. The characteristics of user-submitted jobs can be compared to the baseline characteristics associated with the quality control jobs. This allows the broker to generate a confidence score that reflects at least whether the user-submitted job was performed on the quantum processing unit expected by the user.

20 Claims, 5 Drawing Sheets

QUALITY CONTROL SYSTEM FOR QUANTUM-AS-A-SERVICE BROKERS

FIELD OF THE INVENTION

Embodiments of the present invention generally relate to quality control in quantum computing systems. More particularly, at least some embodiments of the invention relate to systems, hardware, software, computer-readable media, and methods for quality control quantum circuits and quality control mechanisms for quantum processing machines and systems.

BACKGROUND

Although the cost of state-of-the-art servers is expensive, the cost of quantum processing units (QPUs) is orders of magnitude more. And, in addition to the cost, most users simply do not have the ability to host a QPU due to their physical requirements, which may include a cold environs and near-vacuum air pressures.

Fortunately, X-as-a-service (X may be software, function, quantum, etc.) has become more common. More specifically, the rise of cloud computing allows users to run computationally intensive tasks without investing in expensive machines. When a user needs a QPU, the user can use quantum-as-a service.

Accessing quantum-as-a-service is a transaction that is often handled by a broker. This occurs in part because the vendor is focused on building and optimizing the resource to be sold (time on the QPU) and may not desire to spend effort to build an interaction experience with a user or customer.

Accessing QPU services through a broker, however, presents several issues. The first issue relates to transparency. For example, a user may submit a job to a queue and wait for a result. The user has no view into what happens after submitting the job. More specifically, the user has no assurance that the user's job is performed on the hardware the user is expecting (and paid for). While a result may be easy to check, it is more difficult to ensure that the proper hardware was used. It would be useful for a user to have the assurance that their job is executed as expected and on the hardware that was paid for. Vendors may be able to run a job on less expensive machines, but this may impact the accuracy of the results and/or runtime of the submitted job.

Another concern for users relates to QPU specifications. In the context of quantum hardware, a user may have limited knowledge on quantum processing unit specifications. While a user may be able to assess the accuracy of a result, the acceptable level of noise and the expected runtime are not clear.

Another concern is that quantum results can be forged. There are many different quantum simulators that execute on classical hardware and that are intended to mimic the output of a quantum processing unit. However, these applications can be deterministic in nature. Further, simulating any appreciable number of qubits can require substantial time in classical systems because the memory requirements grow exponentially with the number of qubits. Even if the classical system performs the simulation given enough time, exponentially expanding the memory is not feasible.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to quantum computing and to quality control. More particularly, at least some embodiments of the invention relate to systems, hardware, software, computer-readable media, and methods to ensure or verify that jobs are performed by specified or expected quantum hardware.

When execution of a quantum job is requested by a user, the user may specify or identify the QPU (Quantum Processing Unit) to execute the quantum job. A QaaS vendor may have any number of QPUs, including QPUs and/or simulated or virtual QPU (vQPU) executing in classical hardware (processors, memory, etc.). A QaaS vendor or provider may have, for example, 3 QPUs: a simulated QPU, a first 10 qubit QPU, and a second 10 qubit QPU, which may have different characteristics compared to the first 10 qubit QPU. When submitting the quantum job, the user may specify that the quantum job be performed by the first 10 qubit QPU. However, the user may have no assurance that the job is actually performed on the first 10 qubit QPU. The vendor, for various reasons, may decide to use the simulated QPU or the second 10 qubit QPU.

By way of example and not limitation, quality control is performed to give the user assurance or confidence that the QPU used to perform the quantum job was the QPU requested by the user. The confidence or assurance is typically expressed as a confidence score. In one example, the confidence score can be viewed as a probability. In another example, the confidence score may be generated by giving a score to one or more characteristics or attributes, which may be weighted. For example, a broker application can perform an analysis on the output of a QPU. This may generate raw data such as qubit integrity, noise level, actual execution speed, or the like or combination thereof. The confidence score may be generated by synthesizing the raw data. For example, a high confidence score may be generated if all of the characteristics fall within expected ranges. A lower confidence score may be generated if less than all of the characteristics fall within the expected ranges.

In general, QPUs have a limited number of qubits. Some QPUs, for example, have 20-30 qubits. However, a QPU may have fewer or more qubits. QPUs can be configured to perform quantum circuits. A quantum circuit often includes an arrangement of quantum gates, which are analogous to classical logic gates. When executing a quantum circuit, the output is the state of the qubits.

However, the arbitrary state of a qubit cannot be read because measuring the state can collapse the wavefunction. Thus, quantum circuits often end by applying a "measure" gate to each qubit. This allows each qubit to be collapsed in a controlled measure and output the result as a classical "0" or "1". The output of a QPU is a bitstring whose length is equal to the number of qubits.

The amount of data in a bitstring is somewhat limited. For example, there are only $2^N$ states in a bitstring of length N. In order to have robust and reliable data, quantum circuits are often run many times (hundreds, thousands, or more) in sequences. Each individual execution of a circuit is called a shot and the cost of using a QPU is often per-shot. The output of a job (e.g., a circuit with an integer representing the number of shots) is a distribution of bitstrings. The distribution of bitstings allows the final states of the qubits to be approximated. Stated differently, the distribution of bitstrings may reflect the probability of each qubit's final state.

Embodiments of the invention add additional data to the results of a quantum job, which includes quality control information, for an end user. This may include both raw data and an analysis run by a broker between the user and the vendor. The analysis generates the confidence score.

Figure 1:
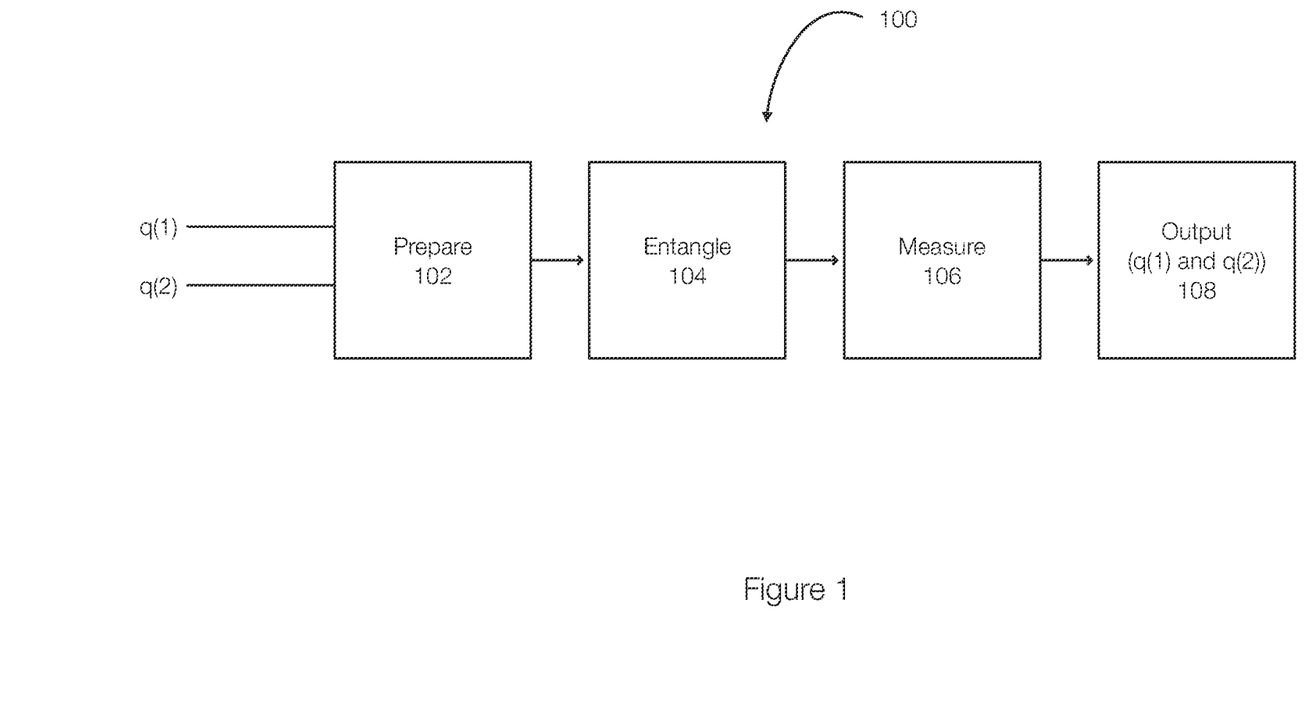
FIG. 1 discloses aspects of a quantum processing unit of system.

FIG. 1 discloses aspects of a quantum circuit. The quantum circuit 100 is provided by way of example only and embodiments of the invention are not limited to any particular type of quantum circuit. Generally, the circuit 100 may receive qubits (e.g., q(1) and q(2)) as inputs. The qubits may be initialized or prepared 102 to a particular state. Stated differently, the input qubits may be initialized based on parameters. In effect, the parameters can be viewed as the input to the circuit 100.

Once prepared, the circuit 100 can be operated or executed. Operating the circuit 100 a single time is referred to herein as a shot. In this execution, the qubits may be entangled 104 (e.g., using quantum gates or the like). The qubits are then measured 106 and recorded as output 108. The output is a bitstring of q(1) and q(2). Because the output 108 of the circuit 100 is probabilistic in nature, a given process may perform a plurality of shots (e.g., hundreds or thousands) for each iteration. The output 108 is returned after all shots have been performed. The output 108 may be distribution of bitstrings.

Quantum circuits, such as the circuit 100, can be used for various purposes. Quantum circuits may be used, by way of example only, to perform optimizations, machine learning, simulation, and the like.

Figure 2A:
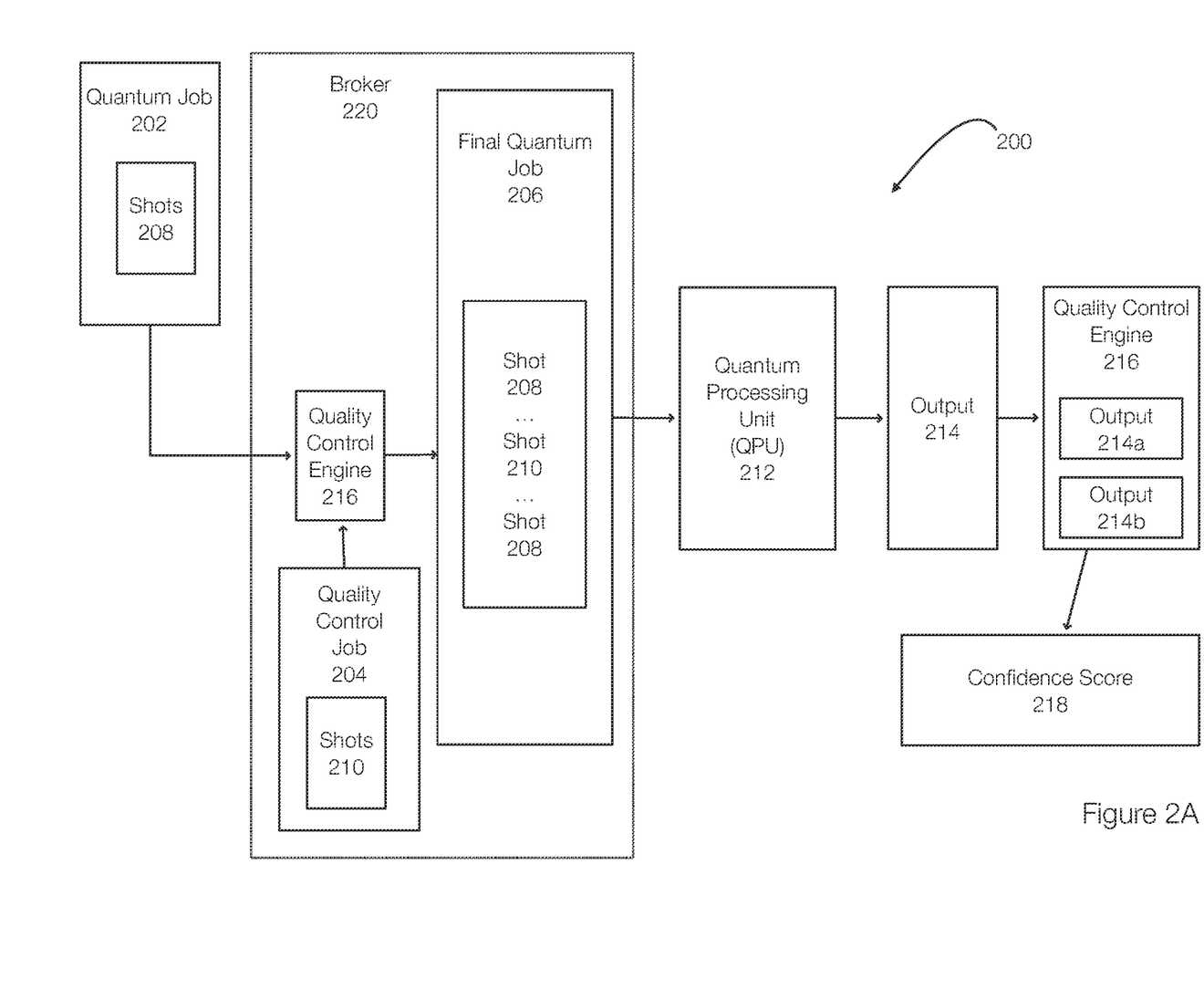
FIG. 2A discloses aspects of quality control for quantum processing units or systems.

FIG. 2A discloses aspects of performing quality control in a quantum processing unit (e.g., a quantum unit machine or a computing device/system that simulates a QPU). In the system 200, a user or customer accesses QaaS. More specifically, a QPU may be accessed via an application programming interface (API). In some examples, a customer or user may submit quantum jobs directly to a provider or vendor. In other examples, quantum jobs may be submitted via a broker. When submitting a quantum job for execution, the QPU may be specified by the user/customer or by the broker. The QPU, for example, may be selected from a list of available QPUs.

In this example, the job 202 in FIG. 2A is submitted to a broker (e.g., a broker application). The broker receives the quantum job 202 from the user/customer and submits that job to the QPU. The broker may also return results of the quantum job 202 to the user. In both cases, the user or customer has little visibility into how the quantum job is handled.

A broker 220 (e.g., a broker application, API, or the like) may be configured to facilitate the submission of the quantum job 202. The broker 220 may present a user interface to the user that allows the user to submit the quantum job 202.

In the system 200, a quantum job 202 is thus generated and prepared for submission to a QPU. The quantum job 202 may be submitted to the broker 220 and received by the quality control engine 216. The quantum job 202 typically identifies at least a quantum circuit and a number of shots 208. Each of the shots results in an output. The quantum job may also be associated with a specified QPU. When the job 202 is performed by the QPU 212, the output 214 may include a distribution of the outputs of all of the shots 208. Information on individual shots may also be included in the output 214.

In one example, the quality control engine 216 is configured to determine whether the job 202 was performed on the correct QPU 212 (i.e., the QPU desired or identified in the submission). More specifically and by way of example, a user may want the job 202 to be performed on a specific or specified QPU. The user may, in addition, desire that their job be performed by an actual QPU rather than QPU emulated in classic compute resources.

To perform a quality control operation, the quality control engine 216 may add a quality control job 204 to the quantum job 202 to generate a final quantum job 206. As illustrated in the final quantum job 206, the shots 210 of the quality control job 204 are interspersed with, or mixed with, the shots 208 of the quantum job 202 in the final quantum job 206. The shots 210 may be mixed in with the shots 208 randomly. The final quantum job 206 is submitted to the QPU 212 and an output 214 is generated.

The quality control engine 216 may be configured to separate the output 214a corresponding to the shots 208 from the output 214b corresponding to the shots 210. Using the output 214b (and/or the output 214a), the quality control engine 216 can provide information that provides a measure of confidence as to whether the quantum job 202 was performed by the requested QPU 212. The quality control engine 216 may generate a confidence score 218 representing a confidence that the quantum job 202 was performed by the QPU 212. In one example, the confidence score is based on a comparison of the output 214b to expectations of the specified QPU. The broker, for example, may be aware of the specifications of the QPU 212 and may have an understanding of the characteristics of outputs generated by the QPU 212. This allows the quality control engine 216 to compare characteristics of the output 214b with the expected characteristics to determine whether the QPU 212 is the specified QPU associated with the quantum job 202.

The quality control job 204 may be created independently of the quantum job 202. In this example, quality control is performed at the shot level. The quality control job 204 (or circuit) can be used in both gate-based quantum computers and quantum annealing computers. The quality control job 204 can be configured for any number of qubits at least because the integrity and noise detection gates are run on an individual qubit basis.

In one example, the quality control job 204 cannot be reconfigured to run on fewer qubits. This ensures that the vendor or provider of the QPU 212 is providing a QPU with the number of qubits required or identified in the quantum job 202. The quality control job 204 cannot be performed on a QPU with fewer qubits.

The analysis performed by the quality control engine 216 may generate data including raw data relating to or describing, by way of example, qubit integrity, noise level, actual execution speed, or the like. The engine control engine 216 may synthesize the raw data to generate a confidence score 218 that can be stored for future use or provided to the user that submitted the quantum job 202. When using the confidence score 218 for subsequent jobs, the confidence score 218 is typically associated with a specific QPU.

To generate the confidence score 218, the quality control engine 216 may compare the raw data against expectations. This comparison can identify values that fall within the expected ranges for a particular QPU. Values that do not fall within the expected ranges can be identified and evaluated. When generating the confidence score 218, the quality control engine 216 may consider know how far the values are outside of the expected ranges.

This information can be converted by the quality control engine 216 into the confidence score 218. For example, if 9 of 10 values fall within the expected ranges, the confidence score 218 may be 90 (out of 100) or 90%. In other examples, certain values or characteristics may be weighted. In another example, the confidence score 218 may be a probability.

In one example, the expected values or ranges of values for the various characteristics may be determined by the quality control engine 216 submitting one or more jobs to the QPU 212, with an assurance from the provider that the QPU 212 is used to execute the one or more jobs. This allows the quality control engine 216 to determine the expected ranges for multiple QPUs including the QPU 212. A similar process may be performed to generate the expected ranges of values for other QPUs. Stated differently, the quality control engine 216 may establish baseline values for one or more characteristics for each of the QPUs of a provider or vendor.

Figure 2B:
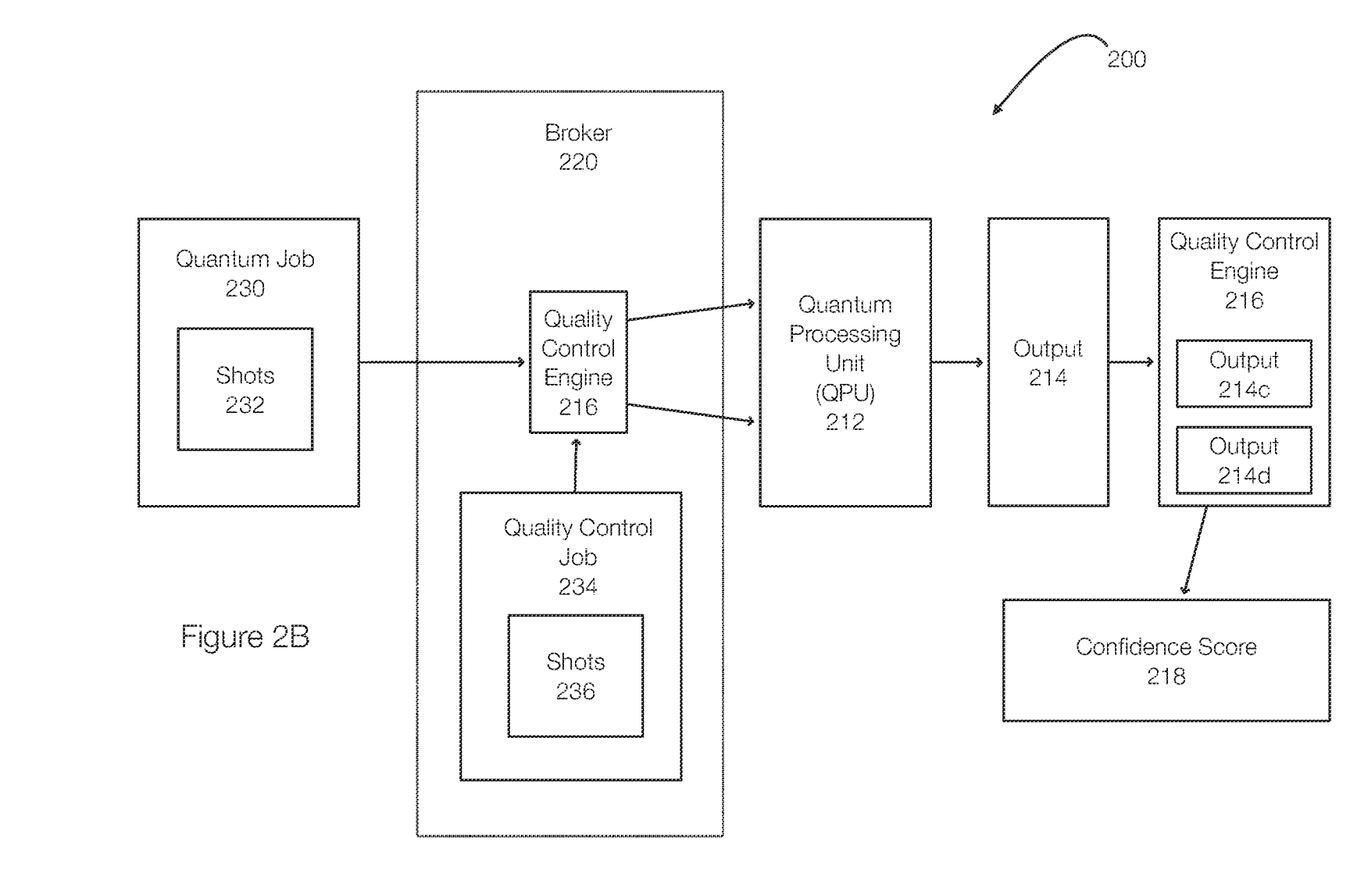
FIG. 2B discloses additional aspects of quality control for quantum processing units or systems.

FIG. 2B discloses additional aspects of quality control in or for quantum processing systems. Instead of running shots of the quality control job 204 alongside or mixed in with the shots of the quantum job 202 as illustrated in FIG. 2A, the quality control engine 216 may simply facilitate quantum jobs such as the quantum job 230 without dispersing or mixing the shots 236 among the shots 232.

Rather, the quality control job 234 is performed as if the job 234 is a user submitted job. Thus, the quality control job 234 is typically performed at a different time than the user-submitted quantum job 230.

Thus, the quality control performed in FIG. 2B is anonymized at the job level while the quality control performed in FIG. 2A is anonymized at the shot level.

In the example of FIG. 2B, the broker 220 facilitates the execution of user submitted jobs 230 as submitted. Thus, the output 214c corresponds to the output for the quantum job 230.

The quality control is performed by submitting the quality control job 234 as if it were a user-submitted quantum job. When performing the quality control job 234, an output 214d may be generated. The quality control job 234 may be submitted periodically, for example hourly, daily, weekly, or according to another schedule, which may not be periodic. The output 214d of each of these jobs is used to generate the confidence score 218. More specifically, the output 214d allows the broker 220 (or the quality control engine 216), to generate baseline ranges of values for the characteristics of the QPU 212 or its output. The confidence score 218 may be generated by comparing the characteristics of the output 214c to the baseline values or ranges of values determined from executing the quality control job 234.

In this example, the confidence score 218 may be provided to all users (this may also be true of the example set forth in FIG. 2A). The confidence score 218, in this example, is identical for all jobs that run on the QPU 212. The confidence score 218 may be updated as additional quality control jobs 234 are performed.

In one example, the quality control engine 216 may be configured to synthesize the results or the output 214 of the QPU 212 to generate the confidence score 218 as previously described. The confidence score 218 may not be definitive but may allow the user to make decisions regarding the QPU 212 or the QPU vendor. For example, a user may select a different vendor if the confidence score 218 is too low for the user.

In one example, the quality control jobs 204 and 234 may include circuits that are specifically configured to aid in generating the confidence score 218. The parameters for the circuit are selected to give particular bitstrings at particular rates for the purpose of testing the QPU 212. In one example, the output of the quality control jobs is known in advance. This allows the outputs or distributions and/or the characteristics thereof, to be compared to expected distributions or characteristics. The confidence score reflects the differences or a comparison between the distributions achieved for a quantum job with the expectations determined from performing the quality control job 234.

In one example, the submission of the quality control job 202 or 234 is performed without notifying the vendor of the purpose of the quality control jobs 202 and 234. This helps ensure some measure of independent verification of the vendor's claims and helps ensure that the user's jobs are performed on the hardware expected by the user.

Embodiments of the invention synthesize the output of a QPU, the distributions output by the QPU, and other data/metadata associated with the output of the QPU to a comprehensive confidence score for the purpose of quality control. This allows a business transaction to be facilitated using readable and easily understood information rather than highly technical data. Embodiments of the invention may be implemented in Qiskit Dell Runtime (QDR), which may serve as a broker for end users purchasing QPU compute for quantum workloads including QPUs and/or hybrid classical-quantum workloads. The confidence score may provide an incentive to users with regard to selecting the QaaS broker from which they would like to purchase services.

Figure 3:
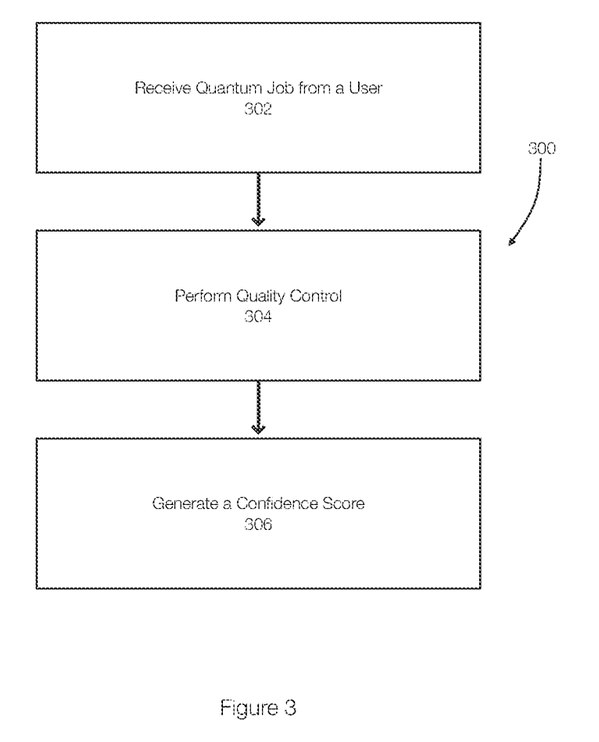
FIG. 3 discloses aspects of quality control operations.

FIG. 3 discloses aspects of performing quality control or quality assurance with regard to quantum computing including quantum hardware. The elements of the method 300 may be performed at different times and may not be performed in the order shown in FIG. 3. Further, some of the elements may be performed multiple times.

The method 300 includes receiving 302 a quantum job from a user. The job is received by a broker and the broker may submit the quantum job to a QPU. The QPU that is supposed to perform the quantum job may be specified by the user or the broker. The broker may also perform 304 quality control, by submitted a quality control job to the same QPU used for the quantum job of the user. Part of quality control may include providing the user with a confidence score.

As a result, the user may receive a current value of a confidence score during submission of the quantum job or prior to submission or after the quantum job is completed. In one example, the user may be presented with a user interface that allows the user to select a QPU from among many QPUs. The confidence score for each QPU may be presented and may factor into the selection performed by the user.

Performing 304 quality control may also include, as discussed with respect to FIG. 2A, generating a final quality control job that includes both the user-submitted job and a quality control job. In this case, the two jobs are performed as a single job and the quality control engine may separate the results in order to give the user a confidence score for that specific job.

Performing 304 quality control, as discussed with respect to FIG. 2B, may include performing quality control jobs on their own as if they were user-submitted quantum jobs. This allows a confidence score to be generated at the job level and is not necessarily specific to a certain quantum job. Rather, the confidence score is general for the jobs submitted to a particular QPU.

In these examples, a confidence score is generated 306. Generating the confidence score may include synthesizing the results of a specific quality control job and/or the results of multiple quality control jobs. Generating the confidence score may also include comparing results with expected results. More specifically, this may include determining whether the qubit integrity, the noise level, the execution speed, or the like, each have an expected value or are each within an expected value range.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, quantum operations, circuit execution operations, quality control operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients or engines that are capable of collecting, modifying, and creating, data. As such, a particular client may employ, or otherwise be associated with, one or more instances of each of one or more applications that perform such operations with respect to data. Such clients or engines may comprise physical machines, containers, or virtual machines (VM).

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a quantum job at a broker, wherein the quantum job is associated with a specified quantum processing unit, performing the quantum job and a quality control job at a quantum processing unit, determining whether the quantum processing unit that performed the quantum job is the specified quantum processing unit associated with the quantum job based on a comparison between characteristics of an output associated the quality control job and expected characteristics of the specified quantum processing unit, and generating a confidence score that reflects a confidence that the quantum job was performed at the specified quantum processing unit Embodiment 2. The method of embodiment 1, further comprising generating a final quantum job that includes shots of a quantum circuit included in the quantum job with shots of a quantum circuit included in the quality control job, wherein the specified quantum processing unit is specified by a user or by a broker.

Embodiment 3. The method of embodiment 1 and/or 2, wherein the quality control job is anonymized at a shot level.

Embodiment 4. The method of embodiment 1, 2, and/or 3, further comprising performing the quality control job separately from the quantum job, wherein the specified quantum processing unit is specified by a user or by a broker.

Embodiment 5. The method of embodiment 1, 2, 3, and/or 4, wherein the quality control job is anonymized at a job level.

Embodiment 6. The method of embodiment 1, 2, 3, 4, and/or 5, further comprising performing the quality control job periodically, wherein the confidence score is provided for all quantum jobs received from one or more users.

Embodiment 7. The method of embodiment 1, 2, 3, 4, 5, and/or 6, wherein the quality control job is configured such that the quality control job cannot be performed using fewer qubits than the requested QPU claims to have.

Embodiment 8. The method of embodiment 1, 2, 3, 4, 5, 6, and/or 7, wherein the characteristics include one or more of a qubit integrity value or a first range of values, a noise level value or a second range of values, or an actual execution speed value or a third range of values.

Embodiment 9. The method of embodiment 1, 2, 3, 4, 5, 6, 7, and/or 8, wherein the confidence score depends on whether the characteristics of the quantum job fall within the first, second, and third ranges of values determined from the quality control job.

Embodiment 10. The method of embodiment 1, 2, 3, 4, 5, 6, 7, 8, and/or 9, further comprising generating a user interface that allows a user to specify the quantum processing unit by selecting the specified quantum processing unit from among a plurality of quantum processing units based on associated confidence values.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
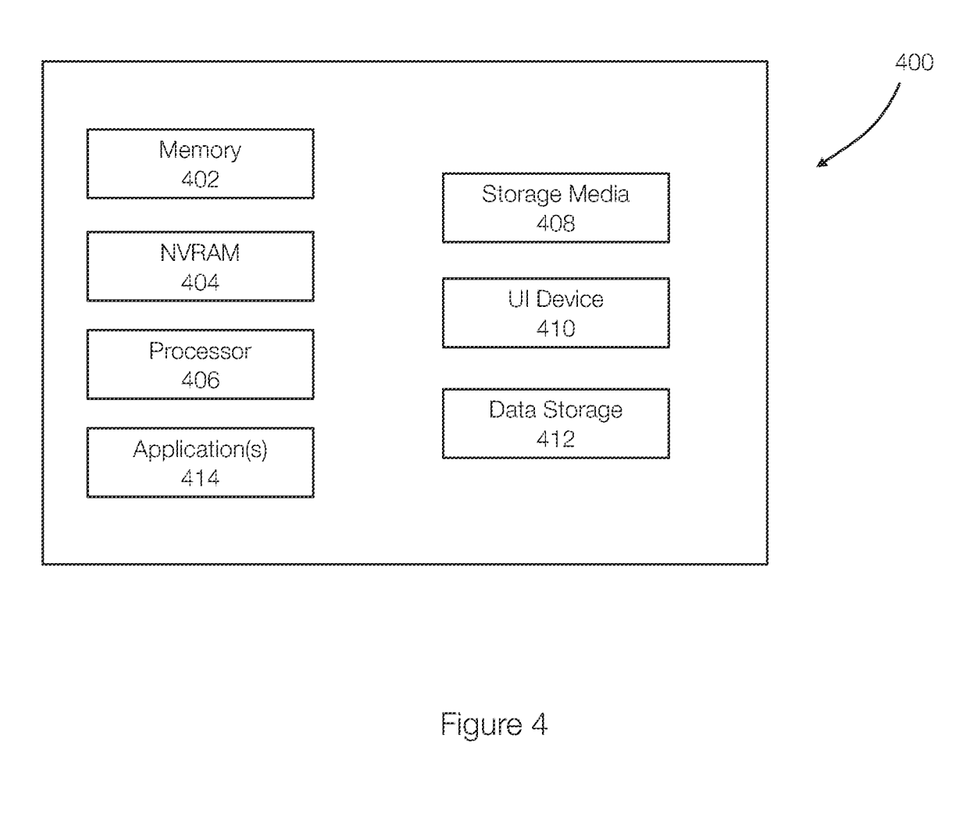
FIG. 4 discloses aspects of a computing devices, system, or entity.

The broker or quality control engine may be implemented with a computing device or system. With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
  receiving a quantum job at a broker, wherein the quantum job is associated with a specified quantum processing unit;
  performing the quantum job and a quality control job at a quantum processing unit;

determining whether the quantum processing unit that performed the quantum job is the specified quantum processing unit associated with the quantum job based on a comparison between characteristics of an output associated the quality control job and expected characteristics of the specified quantum processing unit; and generating a confidence score that reflects a confidence that the quantum job was performed at the specified quantum processing unit.

2. The method of claim 1, further comprising generating a final quantum job that includes shots of a quantum circuit included in the quantum job with shots of a quantum circuit included in the quality control job, wherein the specified quantum processing unit is specified by a user or by a broker.

3. The method of claim 2, wherein the quality control job is anonymized at a shot level.

4. The method of claim 1, further comprising performing the quality control job separately from the quantum job, wherein the specified quantum processing unit is specified by a user or by a broker.

5. The method of claim 4, wherein the quality control job is anonymized at a job level.

6. The method of claim 4, further comprising performing the quality control job periodically, wherein the confidence score is provided for all quantum jobs received from one or more users.

7. The method of claim 1, wherein the quality control job is configured such that the quality control job cannot be performed using fewer qubits than the quantum processing unit claims to have.

8. The method of claim 1, wherein the characteristics include one or more of a qubit integrity value or a first range of values, a noise level value or a second range of values, or an actual execution speed value or a third range of values.

9. The method of claim 8, wherein the confidence score depends on whether the characteristics of the quantum job fall within the first, second, and third ranges of values determined from the quality control job.

10. The method of claim 1, further comprising generating a user interface that allows a user to specify the quantum processing unit by selecting the specified quantum processing unit from among a plurality of quantum processing units based on associated confidence values.

11. A non-transitory storage medium having stored therein instructions that are executable by one or more hardware processors to perform operations comprising:

receiving a quantum job at a broker, wherein the quantum job is associated with a specified quantum processing unit;

performing the quantum job and a quality control job at a quantum processing unit;

determining whether the quantum processing unit that performed the quantum job is the specified quantum processing unit associated with the quantum job based on a comparison between characteristics of an output associated the quality control job and expected characteristics of the specified quantum processing unit; and generating a confidence score that reflects a confidence that the quantum job was performed at the specified quantum processing unit.

12. The non-transitory storage medium of claim 11, further comprising generating a final quantum job that includes shots of a quantum circuit included in the quantum job with shots of a quantum circuit included in the quality control job, wherein the specified quantum processing unit is specified by a user or by a broker.

13. The non-transitory storage medium of claim 12, wherein the quality control job is anonymized at a shot level.

14. The non-transitory storage medium of claim 11, further comprising performing the quality control job separately from the quantum job, wherein the specified quantum processing unit is specified by a user or by a broker.

15. The non-transitory storage medium of claim 14, wherein the quality control job is anonymized at a job level.

16. The non-transitory storage medium of claim 14, further comprising performing the quality control job periodically, wherein the confidence score is provided for all quantum jobs received from one or more users.

17. The non-transitory storage medium of claim 11, wherein the quality control job is configured such that the quality control job cannot be performed using fewer qubits than the requested quantum processing unit claims to have.

18. The non-transitory storage medium of claim 11, wherein the characteristics include one or more of a qubit integrity value or a first range of values, a noise level value or a second range of values, or an actual execution speed value or a third range of values.

19. The non-transitory storage medium of claim 18, wherein the confidence score depends on whether the characteristics of the quantum job fall within the first, second, and third ranges of values determined from the quality control job.

20. The non-transitory storage medium of claim 11, further comprising generating a user interface that allows a user to specify the quantum processing unit by selecting the specified quantum processing unit from among a plurality of quantum processing units based on associated confidence values.

* * * * *